United States Patent
Cormier et al.

(10) Patent No.: US 9,279,258 B2
(45) Date of Patent: Mar. 8, 2016

(54) RECOILING ENERGY ABSORBING SYSTEM WITH LATERAL STABILIZER

(71) Applicant: VICONIC DEFENSE INC., Dearborn, MI (US)

(72) Inventors: Joel M. Cormier, Lathrup Village, MI (US); Donald S. Smith, Commerce, MI (US); Richard F. Audi, Dearborn, MI (US)

(73) Assignee: VICONIC DEFENSE INC., Dearborn, MI (US)

( * ) Notice: Subject to any disclaimer, the term of this patent is extended or adjusted under 35 U.S.C. 154(b) by 0 days.

(21) Appl. No.: 14/271,927

(22) Filed: May 7, 2014

(65) Prior Publication Data

US 2014/0311075 A1     Oct. 23, 2014

Related U.S. Application Data

(63) Continuation-in-part of application No. 13/865,483, filed on Apr. 18, 2013, now Pat. No. 9,194,136.

(51) Int. Cl.
*E04F 15/22* (2006.01)
*F41H 1/04* (2006.01)
(Continued)

(52) U.S. Cl.
CPC .................. *E04F 15/225* (2013.01); *B32B 3/28* (2013.01); *B32B 27/08* (2013.01); *B32B 27/14* (2013.01);
(Continued)

(58) Field of Classification Search
CPC ........... E01C 13/045; E04B 1/92; E04B 5/43; E04F 15/225
USPC ....................... 52/403.1, 789.1, 480; 267/144
See application file for complete search history.

(56) References Cited

U.S. PATENT DOCUMENTS 3,011,602 A * 12/1961 Ensrud et al. ................. 428/180
3,204,667 A * 9/1965 Zahorski ....................... 138/148
(Continued)

FOREIGN PATENT DOCUMENTS

JP     50-136582     10/1975
JP     9150692 A     11/1995
(Continued)

OTHER PUBLICATIONS

International Search Report and Written Opinion; International application No. PCT/US2014/031333; date of mailing Jul. 24, 2014.
(Continued)

*Primary Examiner* — Brian Glessner
*Assistant Examiner* — Paola Agudelo
(74) *Attorney, Agent, or Firm* — Brooks Kushman P.C.

(57) ABSTRACT

A recoiling energy absorbing system has an upper impact surface that is exposed to percussive impact. An energy absorbing layer is positioned below or inside the upper impact surface. The energy absorbing layer includes one or more thermoformed energy absorbing modules. At least some of the modules are provided with one or more energy absorbing units that extend from an upper platform. Several of the energy absorbing units are provided with a flexible wall that extends from the upper platform. A lateral reinforcement member secures the energy absorbing units to prevent them from splaying. The energy absorbing units at least partially absorb energy generated by an impacting object due to the flexible wall bending inwardly or outwardly and recoiling nondestructively after single or multiple impacts to its undeflected configuration.

7 Claims, 6 Drawing Sheets

(51) Int. Cl.

| | | |
|---|---|---|
| *F41H 7/04* | (2006.01) | |
| *F42D 5/045* | (2006.01) | |
| *B32B 27/08* | (2006.01) | |
| *B32B 27/14* | (2006.01) | |
| *B32B 27/32* | (2006.01) | |
| *B32B 27/40* | (2006.01) | |
| *B32B 3/28* | (2006.01) | |
| *E01C 13/02* | (2006.01) | |
| *E04B 1/98* | (2006.01) | |
| *E04C 2/00* | (2006.01) | |
| *F41H 1/00* | (2006.01) | |

(52) U.S. Cl.
CPC ............... *B32B 27/32* (2013.01); *B32B 27/40* (2013.01); *E01C 13/02* (2013.01); *E04F 15/22* (2013.01); *F41H 1/04* (2013.01); *F41H 7/04* (2013.01); *F42D 5/045* (2013.01); *B32B 2307/558* (2013.01); *B32B 2307/56* (2013.01); *B32B 2471/00* (2013.01); *E01C 2201/10* (2013.01); *E04B 1/98* (2013.01); *E04C 2/00* (2013.01); *F41H 1/00* (2013.01)

(56) References Cited

U.S. PATENT DOCUMENTS

| | | | | |
|---|---|---|---|---|
| 3,231,454 | A | * | 1/1966 | Williams ................... 428/132 |
| 3,876,492 | A | | 4/1975 | Schott |
| 4,530,197 | A | * | 7/1985 | Rainville ................... 52/783.15 |
| 4,755,416 | A | * | 7/1988 | Schneider et al. ............ 428/167 |
| 4,890,877 | A | | 1/1990 | Ashtiani-Zarandi et al. |
| 5,383,314 | A | | 1/1995 | Rothberg |
| 5,390,467 | A | * | 2/1995 | Shuert ..................... 52/783.14 |
| 5,399,406 | A | * | 3/1995 | Matsuo et al. ................ 428/57 |
| 5,518,802 | A | * | 5/1996 | Colvin et al. ................ 428/178 |
| 6,715,592 | B2 | | 4/2004 | Suzuki et al. |
| 6,777,062 | B2 | | 8/2004 | Skaja |
| 7,033,666 | B2 | * | 4/2006 | Skaja ..................... 428/178 |
| 7,249,662 | B2 | * | 7/2007 | Itou .......................... F16F 7/12 188/371 |
| 7,416,775 | B2 | * | 8/2008 | Snel ....................... B31D 3/002 428/178 |
| 7,574,760 | B2 | | 8/2009 | Foley et al. |
| 7,866,248 | B2 | | 1/2011 | Moore, III et al. |
| 2005/0133324 | A1 | | 6/2005 | Soto Bailon et al. |
| 2005/0200062 | A1 | * | 9/2005 | Maurer .................... F16F 7/08 267/144 |
| 2005/0281987 | A1 | | 12/2005 | Starke |
| 2011/0135852 | A1 | | 6/2011 | Sawyer |

FOREIGN PATENT DOCUMENTS

| | | |
|---|---|---|
| JP | 08085404 | 4/1996 |
| JP | 11348699 A | 12/1999 |
| WO | 9300845 A1 | 1/1993 |
| WO | 9711825 A3 | 4/1997 |
| WO | 0031434 | 6/2000 |

OTHER PUBLICATIONS

International Search Report and Written Opinion; International application No. PCT/US2015/016103; date of mailing May 15, 2015.

Notice of Allowance and Fee(S) Due; corresponding U.S. Appl. No. 13/865,483; date mailed Aug. 18, 2015.

International Preliminary Report on Patentability; corresponding International application No. PCT/US2014/031333; date of issuance of report Oct. 20, 2015.

* cited by examiner

RECOILING ENERGY ABSORBING SYSTEM WITH LATERAL STABILIZER

CROSS REFERENCE TO RELATED APPLICATIONS

This application is a continuation in part of U.S. Ser. No. 13/865,483 filed Apr. 18, 2013 which is incorporated herein by reference in its entirety.

TECHNICAL FIELD

Several embodiments of the invention relate to recoiling energy absorbing systems that support various impact-receiving surfaces.

BACKGROUND

Flooring and wall structures, for example, have evolved over the years to include technology that absorbs energy transmitted during impact. For instance, synthetic and artificial turfs have been introduced into such impact-receiving surfaces as football and baseball fields in which rubber pebbles help to absorb an impact force applied thereon, reducing the risk of injury for the participants.

In recent years, excessive bodily injuries and concussions have gained more attention as diagnostic tools and methods have evolved. Athletes, military personnel and workers involved in an impact with floors or walls are susceptible to serious injury as a result of such impact. There is a desire for floors and walls in these settings to absorb the impacting force and thereby provide better shielding or impact protection to the individuals or objects that may impact the floor and wall surfaces.

The art considered in preparing this application are: U.S. Pat. Nos. 6,715,592; 7,866,248; and Japanese patent No. JP 11348699.

SUMMARY

One aspect of the present disclosure relates generally to a recoiling energy absorbing ("EA") system with one or more lateral stabilizers. Preferably the system includes resilient thermoplastic formed components manufactured by methods including thermoforming, injection molding, compression molding, and other methods from materials such as thermoplastic polyurethane (TPU), polypropylene (PP), thermoplastic polyolefin (TPO) and the like. Depending on their design, shape and orientation, such materials have the characteristic of at least partial recovery to or towards an undeflected state repeatedly and non-destructively following impact. The thermoformed components are more specifically thermoplastic modules having individual thermoformed units for recoiling and absorbing energy applied thereto. The thermoformed units are supported in one or more trays that afford lateral support to the units before, during and after impact.

In one embodiment, a recoiling energy absorbing system includes an upper impact surface that is exposed to percussive impact. The upper impact surface ("impact-receiving surface") may for example be a playing surface, an ice rink, a hockey arena, a roller blading rink, a gymnasium floor, a basketball court, a tennis court, a wall, a racquetball or squash court, a soccer field, a football or hockey or lacrosse field, a baseball field, ASTROTURF®, a military blast mat, industrial flooring for industrial, retail or domestic home use, various automotive applications such as a load floor, and the like.

The recoiling energy absorbing system further includes an energy absorbing layer positioned inside the upper impact surface. The layer includes one or more thermoformed energy absorbing modules. At least some of the modules are provided with one or more energy absorbing units that extend from an upper platform. The units have portions that are received by and nest in trays in a lateral stability member. At least some of the energy absorbing units are provided with a flexible wall that extends from the upper platform. The energy absorbing units at least partially absorb energy generated by an impacting object via the flexible wall bending inwardly or outwardly without rupture and recoiling after impact to or towards an un-deflected configuration.

As used herein, the terms "upper" and "lower" are used for reference in a non-limiting manner. For example, depending on the spatial orientation of an embodiment of the recoiling energy absorbing system under consideration, such terms may be synonymous with "left" and "right" or "inclined" and similar terminology.

In another embodiment, a recoiling energy absorbing system includes an upper impact surface and an energy absorbing layer, similar to that described above. The energy absorbing layer includes one or more interconnected thermoformed energy absorbing modules. The energy absorbing layer also includes a upper impact surface supporting layer that supports the upper impact surface, and one or more energy absorbing units that extend from the upper impact surface-supporting layer. A coordinating layer supports the energy absorbing units. At least some of the energy absorbing units are provided with a flexible wall that extends from the upper impact surface-supporting layer to the coordinating layer. The units at least partially absorb energy generated by an impacting object by way of the flexible wall bending during impact and recoiling after impact to or towards an undeflected configuration.

In yet another embodiment, an energy absorbing subfloor system comprises an energy absorbing section configured to be disposed between a lower reaction surface and an upper impact surface. The energy absorbing section has a number (N) of basal layers supported by the lower reaction surface. A plurality of energy absorbing units extends from the number (N) of basal layers and towards the impact surface. In practice the basal layer before thermoforming begins as a single sheet. Thermoforming produces recesses made by male and female tools applied to a heated sheet. The recesses in turn form the energy absorbing units. Each energy absorbing unit has an upper platform for supporting the upper impact surface, and a flexible wall extending between the basal layer and the upper platform. During impact, the flexible walls impacted at least partially absorb energy by bending to a deflected position and recoiling after impact to an un-deflected position.

To allow the designer to provide engineered points of weakness or weight-saving techniques, a number (X) of breaches may be defined in the wall (where 0≤X≤1000) and/or a number (Y) apertures may be provided in basal layer (where 0≤Y≤1000). As used herein "breaches" includes slits or slots or combinations thereof.

According to yet another embodiment, a recoiling energy absorbing system includes an upper impact surface that is exposed to percussive impact. The upper impact surface is selected from the group consisting of a playing surface, a roller blading rink, a gymnasium floor, a basketball court, a tennis court, a wall, a racquetball or squash court, a soccer field, a football or hockey or lacrosse field, a baseball field, ASTROTURF®, flooring for industrial retail or domestic home use, walls and floors of military vehicles including helicopters and tanks and the like. An energy absorbing layer positioned inside the upper impact surface includes one or more thermoformed energy absorbing modules, at least some of the modules being provided with a upper impact surface-supporting layer that supports the upper impact surface. The energy absorbing layer also includes a number (N) of energy absorbing units that extend from the upper impact surface-supporting layer, wherein $0 \leq N < 1000$. The energy absorbing units have a height ($H_1$), wherein $H_1 > 0$. At least some of the one or more energy absorbing units are provided with a flexible wall that extends from the upper impact surface-supporting layer. A number (M) of thermoformed veins are also provided that interconnect the flexible walls of at least two of the energy absorbing units, wherein $0 \leq M < 1000$. The veins have a height ($H_2$), wherein $H_1 > H_2 > 0$. The one or more energy absorbing units at least partially absorb energy generated by an impacting object by the flexible wall bending inwardly or outwardly without rupture and recoiling after impact to or towards an un-deflected configuration.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously deploy the present invention.

Floors, walls and ceilings are often subject to percussive impact. This is particularly true in sports settings in which the field and boundary wall surfaces are the recipients of impacts from players. Similarly, in military and industrial settings, blast and work mats are utilized to absorb impact forces that result from explosive events, crashes, falls and the like. These mats function to at least partially absorb these impact forces, thus cushioning the force imparted to the individual or to an object coming into contact with an opposite side of the mat. Floorboards also receive undesirable impacts from people (or equipment) falling from an elevated distance, not only in construction areas but also in homes.

As will be described, an energy absorbing system is provided in the present disclosure. The energy absorbing system is designed to cooperate with such impact-receiving surfaces as floors, walls and ceilings so that energy transferred from an impacting object to the floors, walls and ceilings is at least partially absorbed in a non-destructible manner such that the energy absorbing system is reusable following individual or repeated impacts. In practice, for example, a cyclist need not replace one helmet equipped with the disclosed energy absorbing system and buy a new one after a collision. The absorption of energy reduces the reaction forces applied by the energy absorbing system to the impacting object, thereby reducing the risk of damage or injury to the impacting object and damage, rupture or other insult to the floors, walls and ceilings that may inhibit their ability to cushion future blows.

Figure 1:
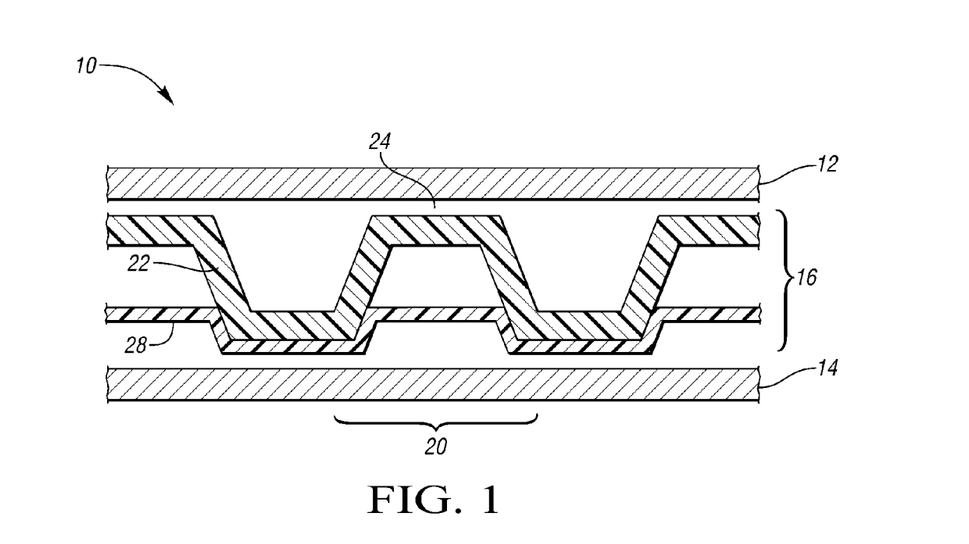
FIG. 1 is a cross-sectional partially exploded view of one illustrative embodiment of a recoiling energy absorbing system in which a lateral support member lies below the energy absorbing units.

Referring to FIG. 1, an energy absorbing system 10 is shown according to one embodiment of the present disclosure. The system 10 includes an upper impact surface or upper impact surface 12 that is exposed to single or repeated percussive impact. The upper impact surface 12 may for example be in the form of a playing surface, an ice rink, a hockey arena, a roller blading rink, a gymnasium floor, a basketball court, a tennis court, a wall, a racquetball or squash court, a soccer field, a football or hockey or lacrosse field, a baseball field, ASTROTURF®, a load floor, a blast mat flooring for military and industrial, retail or domestic home use, various automotive applications and the like. In sum, the upper impact surface 12 may be any surface below which it is desirable to provide for recoiling, non-destructive reusable energy absorption following percussive impact.

A lower reaction surface 14 is provided below the upper impact surface 12. The lower reaction surface 14 acts as a structural sub-floor and takes the same general shape as the upper impact surface 12, i.e., flat, curved, undulating, or curvilinear. Spacing in a cavity between the upper impact surface 12 and lower reaction surface 14 may be convergent, divergent or uniform.

In the cavity between the upper impact surface 12 and the lower reaction surface 14 is an energy absorbing (EA) layer 16 that in one embodiment is made from a thermoformed plastic material, such as that available under the product name SAFETY PLASTIC® from The Oakwood Group, Dearborn, Mich. While references herein are made to the material being thermoformed, it should be understood that the term "thermoformed" is not be construed to be limiting. Other manufacturing methods are contemplated, and thermoforming is but one example. Other ways to make the plastic material can include injection molding, compression molding, plastics extrusion, etc. The EA layer 16 may be thermoformed or otherwise molded into its desired shape. The EA layer 16 includes a base or basal layer 18 and one or more plastic thermoformed energy absorbing units 20 extending from the basal layer 18.

Each individual energy absorbing unit 20 includes one or more sidewalls 22 extending from the basal layer 18. The sidewalls 22 can include multiple wall facets or segments joined together around a perimeter to form frustoconical energy absorbing units. Each unit has a wall 22 that is curved (like a wizard's hat) and linear when viewed from the side, as seen in the profile view of FIG. 1. The wall may be a singular continuous wall (e.g., a circular or frustoconical wall). Running parallel to a vertical axis, one or more breaches (slits—cuts or a gashes or slots—spaces between opposite edges from which material has been removed) may be provided in an intermediate section of a wall or extend from its lower to its upper perimeter or extend from its lower through an intermediate section or from its upper through its intermediate section.

The sidewalls 22 extend towards the upper impact surface 12 and end at an upper platform 24. The upper platforms 24 may also be referred to as a upper impact surface-supporting layer, due to their supporting the upper impact surface 12 from below. Consequently, the upper platform 24 of each energy absorbing unit 20 may be substantially flat to support the underside of the upper impact surface 12. The upper impact surface 12 thus rests above the upper platforms 24, and the basal layer 18 of the EA layer 16 rests above the lower reaction surface 14. Depending on the orientation, the upper platform 24 may assume the position of the basal layer 18 and vice-versa.

The sidewalls 22 are shown to be extending inwardly and upwardly from the basal layer 18 towards the upper platform 24. It should be understood that the sidewalls 22 can also extend outwardly from the basal layer 18 towards the upper platform 24, or the sidewalls 22 can extend substantially perpendicularly to the basal layer 18.

Groupings of the energy absorbing units 20 may form various energy absorbing modules 26. The modules 26 can be connected by living hinges such that a plurality of modules 26 can be bent or deformed to take any desired shape. This enables the modules 26 to cooperate so that an energy absorbing system may be efficiently installed within spatial constraints imposed by an environment of use. Utilization of modules 26 extending in intersecting planes is especially useful in areas in which the upper impact surface 12 or the lower reaction surface 14 is uneven or curved. The modules 26 may also be interconnected via male-and-female meshing connectors or other such connectors. This enables an unlimited number of modules 26 to cooperate or couple to one another to create a relatively large groupings of modules that are suited for large applications, for example, beneath a football field or basketball court.

The energy absorbing layer 16 and some if not all of the energy absorbing units 20 may be made of a resilient thermoplastic formed material such as TPU, PP, or PU. The plastic provides strength to support the upper impact surface 12, yet relative resiliency compared to that of the upper impact surface 12 and the lower reaction surface 14.

Upon the system 10 receiving a force from an impacting object, for example on the upper impact surface 12, the relative resiliency of the energy absorbing layer 16 is provided by the sidewalls 22 to bend inwardly (or outwardly) non-destructively in response to the impacting force. Few or no cracks or micro-cracks are engendered by the blow. The sidewalls 22 bend to a deflected configuration without rupture while receiving the impact force. This bending causes the upper platforms 24 to compress towards the basal layer 18. Subsequently, the sidewalls 22 recoil after the impact force is removed. This causes the sidewalls 22 to substantially revert to an undeflected configuration and thereby allow the upper platforms 24 to decompress away from the basal layer 18. The bending and recoiling of the sidewalls 22 thus enables the energy absorbing units 20 to absorb the impact energy, thereby reducing the risk or amount of damage sustained by either or both of the impacting object or the impact surface 12.

To allow the designer to provide engineered points of weakness or use weight-saving techniques, a number (X) of breaches (slits or slots) may be defined in the wall (where $0 \leq X \leq 1000$) and/or a number (Y) apertures may be provided in basal layer (where $0 \leq Y \leq 1000$).

It should be understood that the energy absorbing units 20 may also include accordion-shaped sidewall regions such that portions of the sidewalls 22 stack on top of one another during the compression (like bellows), and extend back to their normal arrangement after impact. Other configurations are contemplated in which the sidewalls bend, deflect, or otherwise move in order to enable the upper platform 24 to compress towards the basal layer 18 such that the energy absorbing units 20 can absorb at least part of the impact force. The sidewalls 22 may also be formed of such material and strength as to only bend and deflect upon receiving a force above a predetermined threshold.

Below the energy absorbing units 20, a lateral reinforcement member 28 is provided. One of its purposes is to restrain the lateral movement or splaying of the energy absorbing units 20 to impacting forces. The lateral reinforcement member 28 effectively serves as a tray with recesses that coordinates the response. The recesses receive the basal layers 18, a lower perimeter that bounds the basal layers 18 and a lower end region of the sidewalls 22.

Embodiments of the energy absorbing system 10 will now be disclosed as variants of those discussed above and illustrated in FIG. 1. Other illustrative embodiments are illustrated in FIGS. 2-8.

Figure 2:
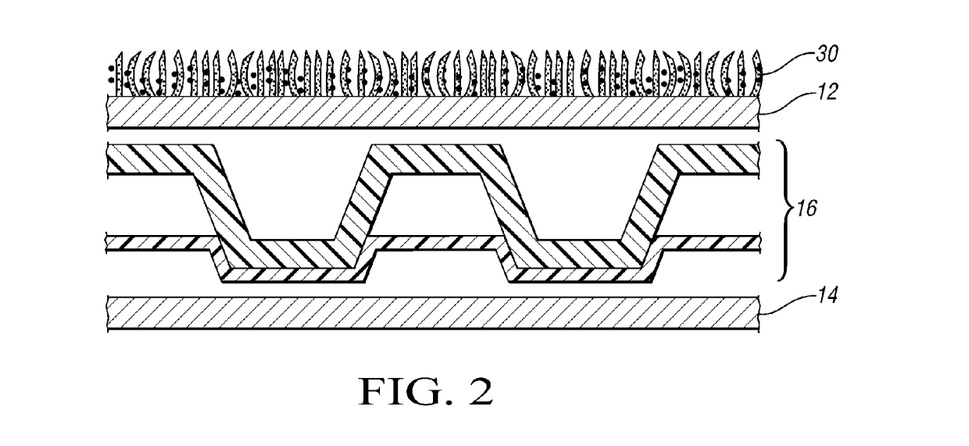
FIG. 2 is a cross-sectional partially exploded view of another illustrative embodiment of a recoiling energy absorbing system in which artificial turf resides above the impact surface and a lateral support member lies below the energy absorbing units.

Referring to FIG. 2, a playing surface, synthetic short pile carpeting or artificial field turf 30 such as ASTROTURF® is provided above the upper impact surface 12. If desired, additives such as antimicrobial agents, rubber infill, backing systems, nylon yarn fibers and plastic may be provided. The turf 30 may include artificial grass as well as rubber particulates buried within the grass. This embodiment may be suitable for football, baseball, soccer, track and field, tennis, field hockey, and other sports in which artificial field turf 30 is utilized. Upon receiving an impact force, the turf 30 transfers the force to the upper impact surface 12. If the force is beyond a yield strength threshold, the sidewalls 22 of the energy absorbing units 20 are caused to deflect as previously discussed such that the energy is absorbed by the units 20.

Figure 3:
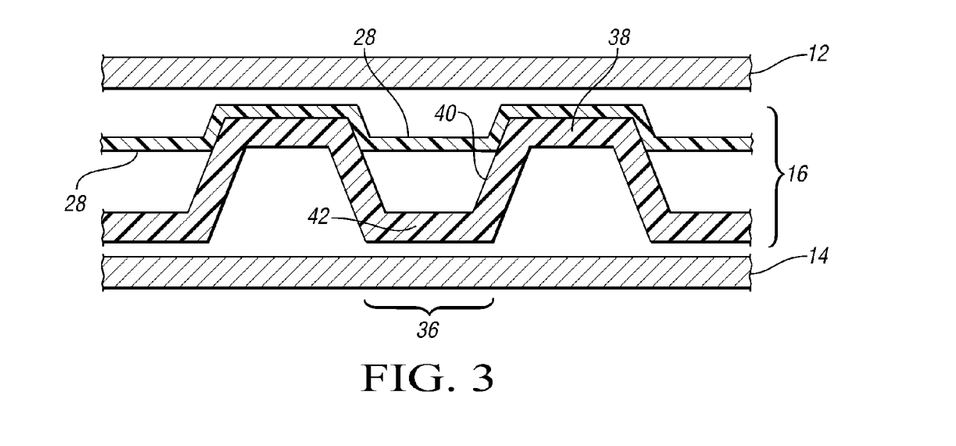
FIG. 3 is a cross-sectional partially exploded view of another illustrative embodiment of a recoiling energy absorbing system in which energy absorbing units lie below a lateral support member.

Referring to FIG. 3, energy absorbing units 36 extend between the reaction surface 14 and the lateral reinforcing member 28, which is interposed between the upper platform 38 and the upper impact surface 12. In this embodiment, the energy absorbing layer 16 includes the lateral reinforcing member 28 and the energy absorbing modules 26. If desired the upper platforms 38 may be adhered the lateral reinforcing member 28, which may also be adhered to an underside of the upper impact surface 12. Sidewalls 40 extend downwardly towards a lower platform or basal layer 42. In short, the energy absorbing layer 16 is reversed from its configuration illustrated in FIGS. 1-2. During a percussive impact force, the upper platform 38 compresses towards the sidewalls 40 of at least some of or each energy absorbing unit 36.

Figure 4:
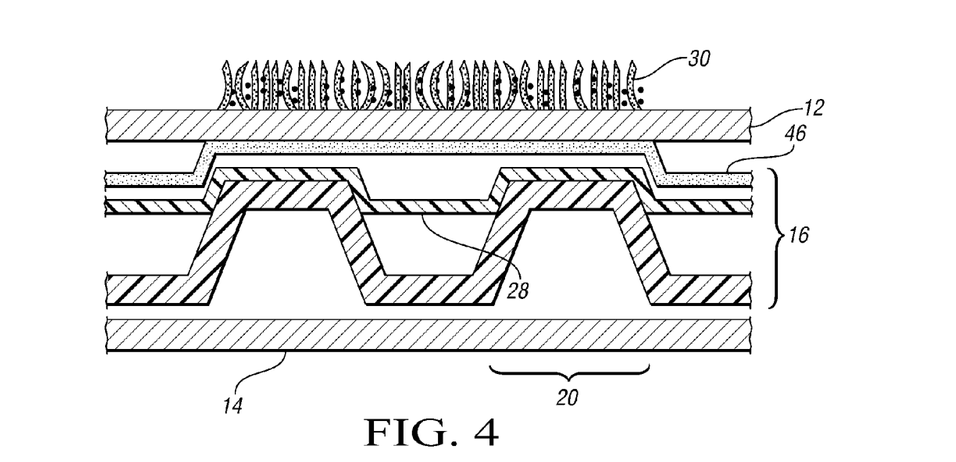
FIG. 4 is a cross-sectional partially exploded view of another illustrative embodiment of a recoiling energy absorbing system in which a sealant layer lies atop a lateral support member and a plurality of the energy absorbing units.
Figure 5:
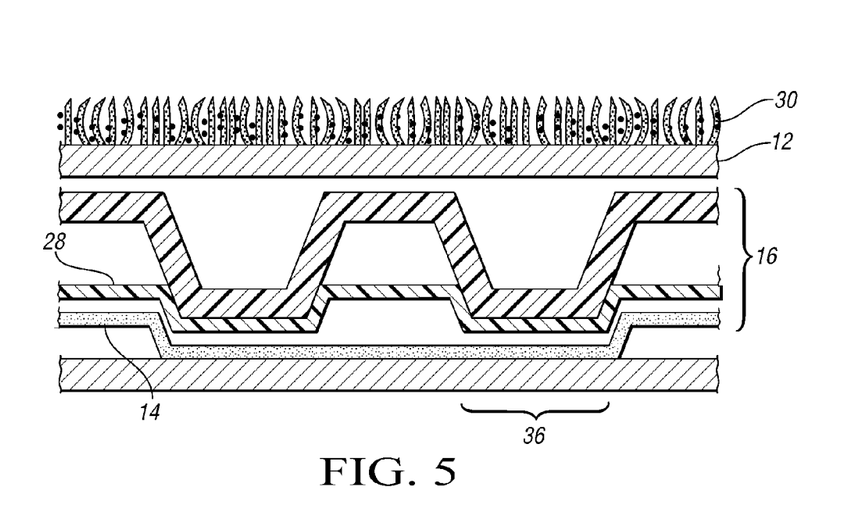
FIG. 5 is a cross-sectional partially exploded view of another illustrative embodiment of a covered recoiling energy absorbing system in which a sealant layer underlies the lateral support member and energy absorbing units.

Referring to FIG. 4, a sealant layer 46 is disposed between the upper impact surface 12 and the energy absorbing layer 16. The sealant layer 46 acts as a moisture barrier above the energy absorbing layer 16 such that rain and other liquids are unable to reach the reaction surface 14. In order to serve as a suitable moisture barrier, the sealant layer 46 may be made of a flexible and thin plastic material. The sealant layer 46 may conform to the exterior of one or more energy absorbing units 20. While the sealant layer 46 is shown located between the reaction surface 12 and the energy absorbing layer 16, it should be understood that a sealant layer 46 may alternatively or additionally be provided between the reaction surface 14 and the energy absorbing layer 16 (as shown in FIG. 5). Artificial field turf 30 may be provided above and conform to at least a portion of the upper impact surface 12.

As a variant of the embodiments shown in FIGS. 1-4, the embodiment illustrated in FIG. 5 shows a sealant layer 46 provided below the lateral reinforcement member 28. Some or all of the sealant layer 46 can also conform to the lower portions of one or more energy modules 26, such that the sealant layer 46 conforms to the general shape of the entire energy absorbing system 10.

Figure 6:
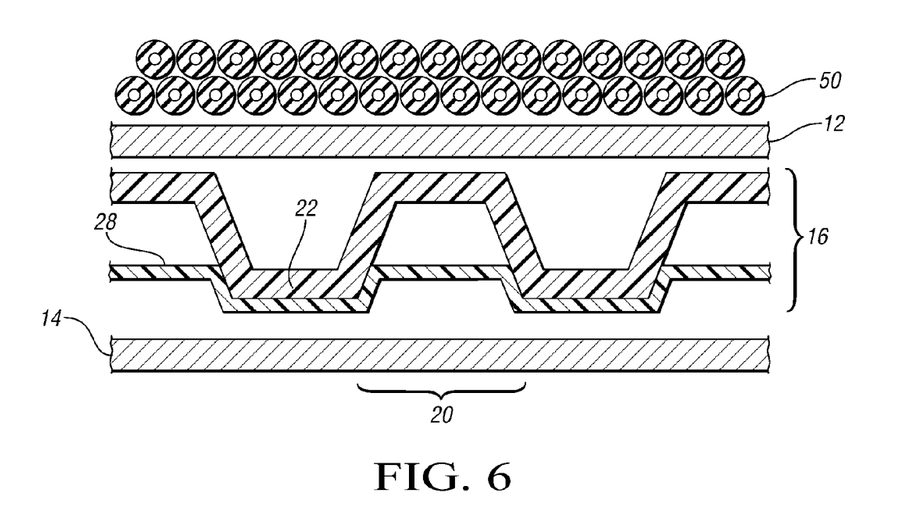
FIG. 6 is a cross-sectional partially exploded view of another illustrative embodiment of a recoiling energy absorbing system in which particulates or synthetic pellets are provided above the impact surface.

FIG. 6 illustrates an embodiment that is particularly useful in, for example, a playground or outdoor basketball setting. A particulate impact surface 50 is provided above the upper impact surface 12. The particulate impact surface 50 is known in the art as a useful cushioning surface typically found in playgrounds other areas in which children play. The particulate impact surface 50 may be formed from rubber, plastic, or other natural or synthetic particulates. It may or not be bonded to the lower reaction surface 14. During a percussive impact, the particulate impact surface 50 first absorbs at least some of the impacting force due to its material characteristics. If a force above a threshold continues to be transferred through the particulate impact surface 50, the upper impact surface 12 transfers at least some of the force to the energy absorbing layer 16. The energy absorbing units 20 can absorb the impacting energy due to the walls 22 bending and flexing, as previously disclosed.

Figure 7:
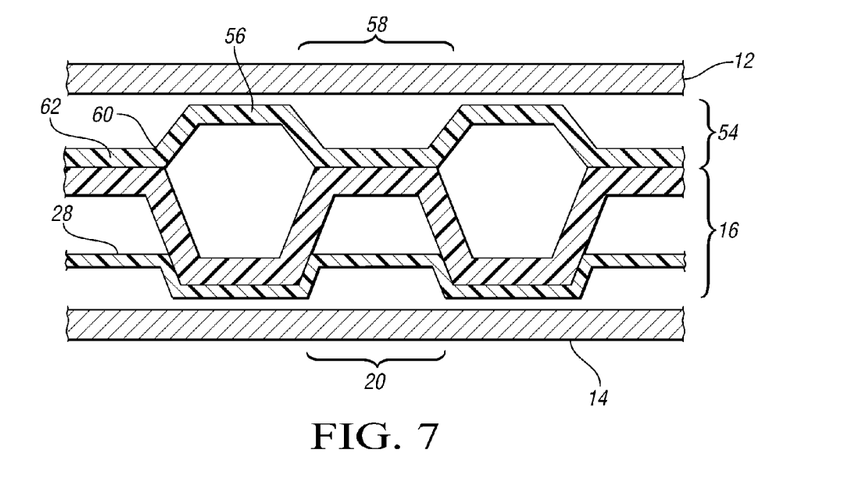
FIG. 7 is a cross-sectional partially exploded view of another illustrative embodiment of a recoiling energy absorbing system in which an additional layer of energy absorbing units is provided.

Referring to FIG. 7, a second energy absorbing layer 54 is provided between the layer 16 and the upper impact surface 12. This second layer 54 provides more energy absorbing ability in the system 10. The second layer 54 includes a basal layer 56 that rests below the upper impact surface 12. A plurality of energy absorbing units 58 extends from the basal layer 56 and towards the lower reaction surface 14. Sidewalls 60 extend inwardly towards a platform 62. The platform 60 rests above the upper platform 24 of the energy absorbing unit 20 of layer 16.

Upon receiving a percussive impact from the upper impact surface 12, the sidewalls 60 bend inwardly (or outwardly) and the basal layer 56 compresses towards the platform 62. Once the basal layer 56 has substantially compressed, the force is transferred from the second EA layer 54 to the first energy absorbing layer 16, in which the upper platform 24 compresses towards the lower reaction surface 14. The basal layer 56 may extend into the interior of the energy absorbing units 20 below during energy absorption.

The embodiment illustrated in FIG. 7 thus provides for a two-tiered energy absorbing system, in which energy is transferred and absorbed by two overlapping layers 16, 54. If desired, additional energy absorbing layers may be provided. For example, third and fourth layers of energy absorbing units may be disposed above layer 54. Each layer of energy absorbing units compresses towards an underlying layer of energy absorbing units when the system 10 is subjected to the percussive force. The stiffness characteristics of the various layers can be "tuned" if desired. Thus, the designer may choose to have the outermost EA layers absorb more of the blow or deflect more than the innermost layers, or vice versa. Some or all of the energy absorbing layers 54, 16 may be fortified by a lateral reinforcing member 28.

Figure 8:
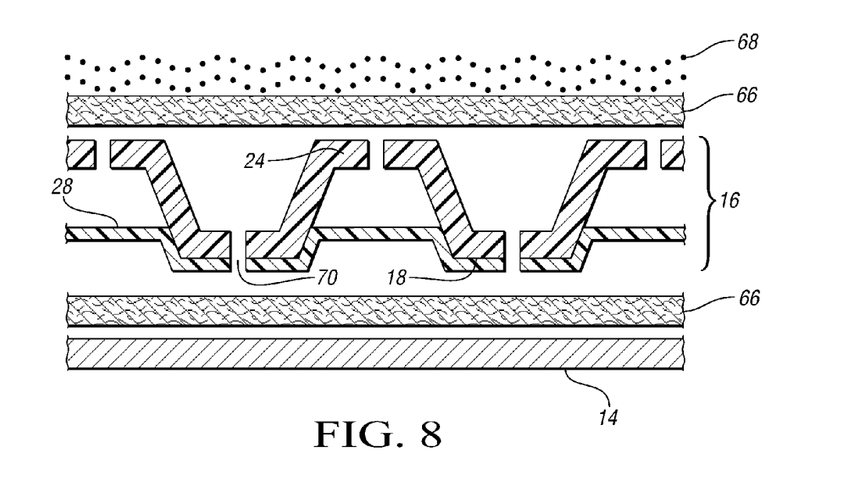
FIG. 8 is a cross-sectional partially exploded view of another illustrative embodiment of a recoiling energy absorbing system in which a drainage system is provided with a permeable fabric and apertures in the energy absorbing layer.

Referring to FIG. 8, an embodiment of a drainage system is illustrated. A layer of fabric 66 is provided above and below the energy absorbing layer 16. The fabric 66 may be a landscape fabric that allows water to permeate there through while blocking UV light so as to inhibit the growth of weeds and other unwanted plants. Synthetic materials 68, such as rubber or plastic pellets, can be placed above the fabric 66 to facilitate water draining. Grass and other plants can also be provided near cut-outs in the fabric 66. Apertures 70 are provided in either or both of the basal layer 18 and the upper platform 24 and the lateral reinforcement member 28. The apertures 70 allow moisture and liquids to pass through the layer 16 so that the moisture and liquids can be irrigated via drains (not shown) away from the energy absorption system 10. The surfaces of basal layer 18 and the upper platforms 24 may slightly slope towards the apertures 70 to guide the liquid to flow through the apertures 70 and into the drains.

Figure 9:
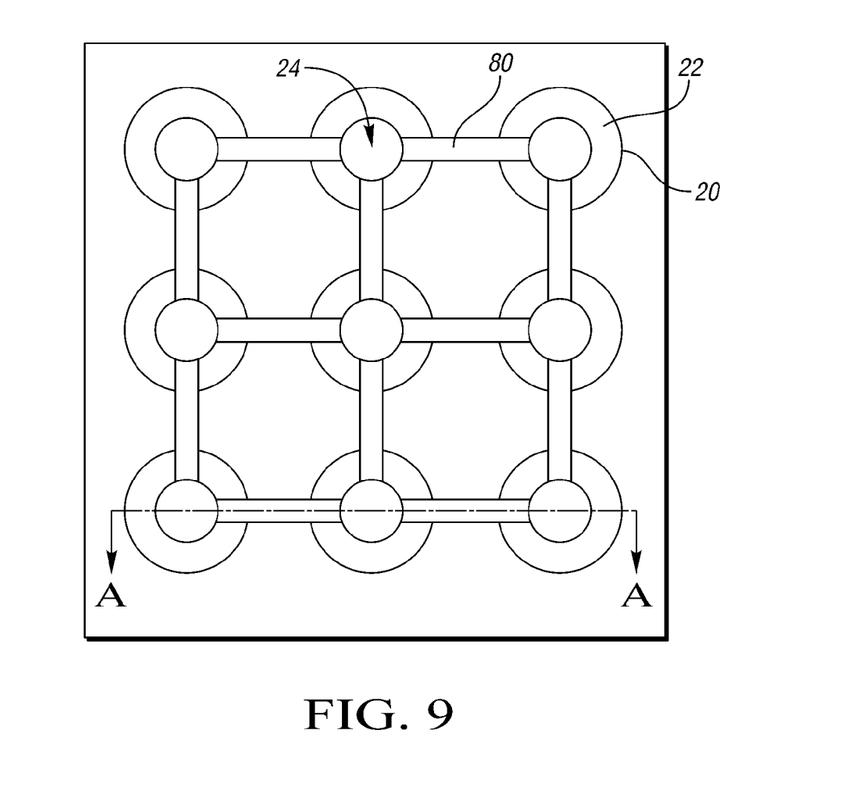
FIG. 9 is a plan view of an alternate embodiment of a recoiling energy absorbing system with an outer skin and a lateral reinforcing member removed.

Referring to FIG. 9, an alternative embodiment is illustrated in which a plurality of energy absorbing units 20 are arranged in a grid. It should be understood that while a grid is illustrated in this figure, the units 20 need not be arraigned in a grid nor arranged uniformly. Similar to previous embodiments, side walls 22 extend upwardly from basal layers 18 that lie between the energy absorbing units 20 towards an upper platform 24.

Figure 10:
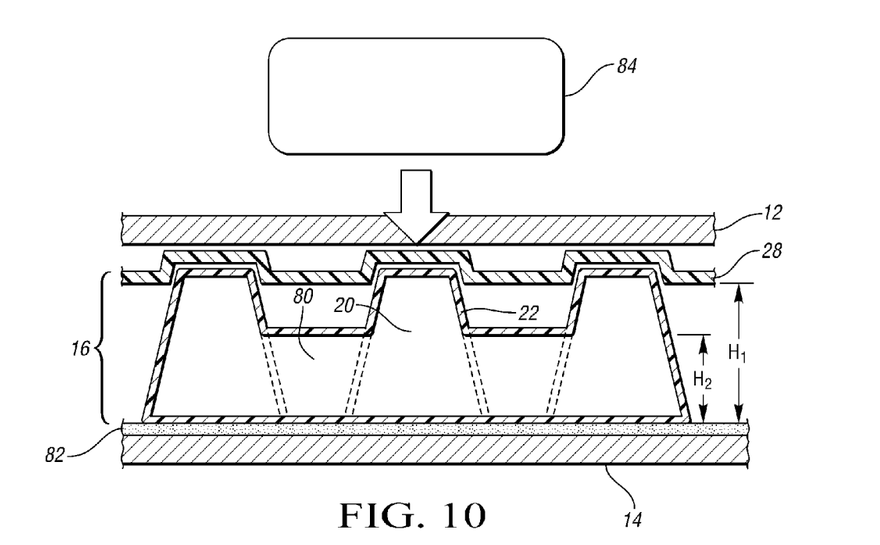
FIG. 10 is a side view of the embodiment illustrated in FIG. 9 with the upper impact surface shown as receiving an external force, supported by the lateral reinforcement member.
Figure 11:
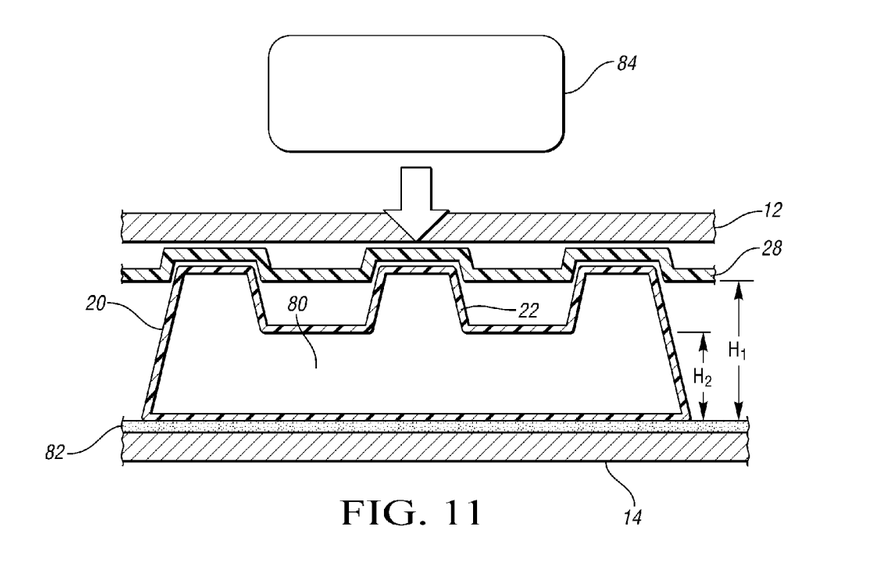
FIG. 11 is a cross-sectional view taken along the line A-A of FIG. 9 along with the upper impact surface shown as receiving an external force, supported by the lateral reinforcement member.

Referring to FIGS. 9-11, a plurality of veins 80 interconnect the energy absorbing units 20. The veins 80 are thermoformed along with the units 20. Aided by the lateral reinforcement member 28, the veins 80 provide rigidity to the energy absorbing system 10 yet are flexible to help absorb and transfer energy received from an impacting object. The veins 80 also coordinate and facilitate the distribution of the transfer of energy among the units 20. For example, if an impacting object impacts a region near one energy absorbing unit 20, when that unit 20 compresses to absorb the force, the force is also transmitted laterally from one unit 20 to another via the interconnecting veins 80 and the basal layer 18. This may be beneficial in very high impact regions in which a distribution of force throughout the units 20 is necessary. For instance, this embodiment may be particularly useful in floors, walls and ceilings of military vehicles including helicopters and tanks and the like in which large impacting forces from projectiles are exerted on the upper impact surfaces 12 of the vehicle.

Referring to FIGS. 10 and 11, a side view and a cross-sectional view taken along line A-A of the embodiment shown in FIG. 9 are illustrated, respectively. The upper impact surface 12 is provided above and outboard of the energy absorbing units 20. Between the upper impact surface (outer shell) 12 and the upper platform 24 of the energy units 20 lies the lateral reinforcement member 28. The upper impact surface 12 may be in the form of the inner surface of a military vehicle, for example, and the entire energy absorbing assembly may be placed within walls of the military vehicle.

Each vein 80 connects at least one energy absorbing unit 20. The energy absorbing layer 16 has an overall height $H_1$ and the veins 80 have an average height $H_2$. The veins may be straight or rounded. It should be understood that $H_2$ can be between 0 and $H_1$ in various embodiments for a desired height $H_2$ of the veins 80. For example, if no veins 80 are desired, then the height $H_2$ may be equal to 0. Furthermore, a number M of veins 80 may be provided that correspond to a number N of energy absorbing units 20. According to FIG. 9, M>N. However, other embodiments are contemplated in which M<N (for example, two energy absorbing units 20 interconnected by one vein 80). It should be understood that M and N can be equal to zero or between 0 and 1,000 or greater, for any particular embodiment.

A layer of adhesive 82 is optionally provided to adhere the energy absorbing layer 16 to the lower reaction surface 14. The adhesive 82 is a flexible glue or other adhesive such that the adhesive 82 can bend and flex without rupture as energy is absorbed throughout the energy absorbing layer 16. The lower reaction surface 14 may be in the form of an exterior surface of a military vehicle. When an impacting object 84 (such as a boot, a weapon, a piece of armor, or other objects within the vehicle) impacts the upper impact surface 12, the veins 80 and the lateral reinforcement member 28 distribute at least some of the force laterally to nearby energy absorbing units 20. This works to inhibit the force from rupturing or destroying the energy absorbing layer 16 and injuring an occupant within the military vehicle.

In the illustration provided in FIG. 11, the material thickness of the thermoformed energy absorbing units 20, the side walls 22, the lateral reinforcement member 28 and the interconnecting veins 80 is shown.

It should be understood that the embodiments illustrated in FIGS. 9-11 can be applied to any of the previously-described embodiments. For example, the energy absorbing system 10 may be provided with veins 80 and an adhesive layer 82.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A recoiling energy absorbing system comprising
an upper impact surface that is exposed to percussive impact, the upper impact surface being selected from the group consisting of floors, walls around or ceilings above a playing surface, an ice rink, a hockey arena, a roller blading rink, a gymnasium, a basketball court, a tennis court, a wall, a racquetball or squash court, a soccer field, a football or hockey or lacrosse field, a baseball field, artificial turf, a military blast mat, industrial flooring for industrial, retail or domestic home use, and a load floor for an automotive application,
an energy absorbing layer positioned adjacent to a side of the upper impact surface opposite to a side that receives the percussive impact, the energy absorbing layer having one or more thermoplastic formed energy absorbing modules, at least some of the modules being provided with
one or more energy absorbing units including an upper platform that is juxtaposed with the upper impact surface, at least one of the one or more energy absorbing units having a frustoconical shape, at least some of the one or more energy absorbing units being provided with
a flexible curvilinear wall that extends from the upper platform away from the upper impact surface;
a basal layer between the energy absorbing units;
a lateral reinforcing member defining recesses that receive part of the flexible walls and the basal layer, so that a gap lies between the lateral reinforcing member and the upper platform to accommodate deformation, wherein the upper platform is supported by the flexible wall, and the energy absorbing units extend between the lateral reinforcing member and the upper impact surface and wherein the lateral reinforcement member lies in contact with a lower end of the sidewall and the basal layer;
the one or more energy absorbing units at least partially absorbing energy generated by an impacting object by the flexible wall bending inwardly or outwardly without rupture and recoiling non-destructively after impact to or towards an un-deflected configuration.

2. The recoiling energy absorbing system of claim 1, wherein at least one of the basal layer and the upper impact surface is provided with a plurality of apertures (X), where $1 \leq X \leq 1000$.

3. The recoiling energy absorbing system of claim 1, wherein the energy absorbing units extend downwardly obliquely from the upper impact surface and towards an underlying reaction surface.

4. The recoiling energy absorbing system of claim 1, wherein the energy absorbing layer includes two or more energy absorbing units, and wherein a sealant layer overlies two or more of the energy absorbing units.

5. The energy absorbing subfloor system of claim 1, wherein at least one of the upper platform and basal layer defines an irrigation aperture.

6. The energy absorbing subfloor system of claim 1, further comprising a sealant layer between the basal layer and the lower reaction surface.

7. The energy absorbing subfloor system of claim 1, further comprising a sealant layer between the upper platforms of the energy absorbing units and the upper impact surface.

* * * * *